(12) United States Patent
Takayama et al.

(10) Patent No.: US 10,893,750 B2
(45) Date of Patent: Jan. 19, 2021

(54) METHOD FOR PRODUCING SEAT CORE MATERIAL, AND SEAT CORE MATERIAL

(71) Applicant: JSP CORPORATION, Tokyo (JP)

(72) Inventors: Atsuo Takayama, Kanuma (JP); Motoaki Ueguri, Utsunomiya (JP); Keiichi Hashimoto, Nikko (JP)

(73) Assignee: JSP CORPORATION, Tokyo (JP)

( * ) Notice: Subject to any disclaimer, the term of this patent is extended or adjusted under 35 U.S.C. 154(b) by 137 days.

(21) Appl. No.: 16/062,644

(22) PCT Filed: Dec. 20, 2016

(86) PCT No.: PCT/JP2016/087921
§ 371 (c)(1),
(2) Date: Jun. 15, 2018

(87) PCT Pub. No.: WO2017/110798
PCT Pub. Date: Jun. 29, 2017

(65) Prior Publication Data
US 2018/0368578 A1 Dec. 27, 2018

(30) Foreign Application Priority Data
Dec. 21, 2015 (JP) ................................. 2015-248389

(51) Int. Cl.
*A47C 7/18* (2006.01)
*B60N 2/90* (2018.01)
(Continued)

(52) U.S. Cl.
CPC ................. *A47C 7/18* (2013.01); *A47C 7/24* (2013.01); *A47C 27/14* (2013.01); *B29C 39/10* (2013.01);
(Continued)

(58) Field of Classification Search
CPC .... A47C 7/18; A47C 7/24; A47C 7/14; B60N 2/90; B60N 2/68; B60N 2/682;
(Continued)

(56) References Cited

U.S. PATENT DOCUMENTS 8,690,240 B2  4/2014  Takakura et al.
2004/0031137 A1  2/2004  Shimano et al.
(Continued)

FOREIGN PATENT DOCUMENTS

CN  2429291 A1  11/2003
CN  102452342 A  5/2012
(Continued)

OTHER PUBLICATIONS

Supplementary European Search Report in corresponding European Application No. 16878687, dated Jun. 18, 2019.
(Continued)

*Primary Examiner* — Stella K Yi
(74) *Attorney, Agent, or Firm* — Bacon & Thomas, PLLC (57) ABSTRACT

A method for producing a seat core material that has a foamed molded substrate and a frame member embedded in a periphery thereof, which includes, as step (a), heating thermoplastic resin expanded beads in a mold cavity, in which the frame member has been disposed, to fusion-bond the expanded beads to each other and to obtain the foamed molded substrate with the frame member being embedded in the periphery thereof; and, as step (b), simultaneously with step (a) or after step (a), forming a void cavity S, S' in the foamed molded substrate at a position along and adjacent to the frame member. The void cavity S, S' has a size and shape that allows a relative displacement between the frame member and the foamed molded substrate when the foamed molded substrate shrinks after step (b).

11 Claims, 7 Drawing Sheets

(51) Int. Cl.
*A47C 27/14* (2006.01)
*A47C 7/24* (2006.01)
*B60N 2/68* (2006.01)
*B29C 39/10* (2006.01)
*B60N 2/70* (2006.01)
*B29L 31/58* (2006.01)
*B60N 2/58* (2006.01)

(52) U.S. Cl.
CPC ............... *B60N 2/68* (2013.01); *B60N 2/682* (2013.01); *B60N 2/7017* (2013.01); *B60N 2/90* (2018.02); *B29L 2031/58* (2013.01); *B32B 2266/0292* (2013.01); *B60N 2/5825* (2013.01)

(58) Field of Classification Search
CPC .... B60N 2/7017; B60N 2/7035; B29C 39/10; B29C 63/025; B29C 66/436; B29C 44/08; B29C 44/128; B29C 44/1233; B29C 44/206; B29C 44/3461; B29C 44/3492; B29C 44/445
See application file for complete search history.

(56) References Cited

U.S. PATENT DOCUMENTS

| | | |
|---|---|---|
| 2012/0098323 A1 | 4/2012 | Fujimoto et al. |
| 2012/0126606 A1* | 5/2012 | Takakura ............ B60N 2/5825 297/452.18 |

FOREIGN PATENT DOCUMENTS

| | | |
|---|---|---|
| JP | 10-249882 A | 9/1998 |
| JP | 2010105304 | 5/2010 |
| JP | 2015097596 A | 5/2015 |
| JP | 2015-136851 A | 7/2015 |
| JP | 2015-174340 A | 10/2015 |
| JP | 2015-196015 A | 11/2015 |
| JP | 2015196015 | * 11/2015 |

OTHER PUBLICATIONS

International Search Report on PCT/JP2016/087921 dated Apr. 4, 2017.
China Search Report dated Apr. 11, 2020, in corresponding Application No. 2016800752710, with English translation.

* cited by examiner

METHOD FOR PRODUCING SEAT CORE MATERIAL, AND SEAT CORE MATERIAL

The present invention relates to a method for producing a seat core material used in a vehicular seat element such as a seat cushion and a seat back, and to a seat core material.

BACKGROUND OF THE INVENTION

In recent years, foamed molded substrates obtained from thermoplastic resin expanded beads have been increasingly used as a seat core material used in vehicular seat elements. The reason for this is because the foamed molded substrates have merits that they enable reduction in weight thereof as compared with urethane foams and make it possible to produce seat core materials having high strength. Such a foamed molded substrate is obtainable by an in-mold molding method in which thermoplastic resin expanded beads charged in a mold cavity are heated with high temperature steam.

In a foamed molded substrate of such a seat core material, a frame member for maintaining the shape and strength of the seat core material and metal fittings for coupling to a vehicle are disposed (see Patent document 1).

RELATED ART DOCUMENTS

Patent Document

Patent document 1: U.S. Pat. No. 8,690,240

SUMMARY OF THE INVENTION

It has been found that when thermoplastic resin expanded beads are heated in a mold cavity, in which a frame member has been disposed, to fusion-bond the expanded beads to each other and to integrally mold a foamed molded substrate with the frame member being embedded therein, bending of the frame member and warpage of the foamed molded substrate occur due to the shrinkage of the foamed molded substrate after it has been molded.

When the frame member and the foamed resin molded body are deformed during the integral molding of the foamed molded substrate and the frame member, there are caused, for example, misalignment of the relative position of the metal fittings and the dimensional difference of the seat core material as a whole from the desired dimension. As a result, it becomes difficult to mount the seat core material on the vehicle. Such a problem of deformation is not caused when a seat core material is formed by first molding a foamed molded substrate and then fitting a frame member thereinto. This method, however, causes an increase of costs and time because of the necessity of such a post process.

It is an object of the present invention to provide a method for producing a seat core material having a foamed molded substrate integrally molded together with a frame member with the frame member being embedded therein, which method can prevent deformation of the frame member and the seat core material due to shrinkage of the foamed molded substrate and can provide the seat core material with desired dimension and shape. The present invention is also aimed at the provision of such a seat core material.

In accordance with the present invention there is provided the following method for producing a seat core material:

[1] A method for producing a seat core material that has a foamed molded substrate and a frame member embedded in a periphery thereof, said method comprising the steps of:

(a) heating thermoplastic resin expanded beads in a mold cavity, in which the frame member has been disposed, to fusion-bond the expanded beads to each other and to obtain the foamed molded substrate with the frame member being embedded in the periphery thereof; and (b) simultaneously with step (a) or after step (a), forming a void cavity in the foamed molded substrate at a position along and adjacent to the frame member, wherein said void cavity has a size and shape that allows a relative displacement between the frame member and the foamed molded substrate when the foamed molded substrate shrinks after step (b).

[2] The method for producing a vehicular seat according to above [1], wherein said frame member is a looped frame having a front frame section, a rear frame section and two side frame sections that interconnect the front and rear frame sections, wherein step (a) is carried out such that the foamed molded substrate is formed with a front end, a rear end and two side ends, said front frame section, two side frame sections and rear frame section being embedded in the foamed molded substrate at positions spaced inward from the front end, two side ends and rear end, respectively, and wherein step (b) is carried out such that the void cavity is formed in the foamed molded substrate at a position adjacent to at least one of the rear frame section and side frame sections.

[3] The method for producing a vehicular seat core material according to above [1] or [2], wherein step (a) is carried out such that the foamed molded substrate is additionally formed with two rear corner recesses, wherein interconnected portions between the two side frame sections and the rear frame section are completely exposed from the foamed molded substrate at the respective two rear corner recesses.

[4] The method of producing a vehicular seat core material according to [3], wherein step (a) is carried out such that the rear end of the foamed molded substrate is additionally formed with a rear center recess between the two rear corner recesses so that the rear end is divided into two parts by said rear center recess between the rear corner recesses, and wherein the rear frame section is embedded in the foamed molded substrate at positions spaced inward from each of the two parts and completely exposed from the foamed molded substrate at the rear center recess.

[5] The method according to any one of above [2] to [4], wherein step (b) is carried out simultaneously with step (a), wherein step (a) is carried out such that the foamed molded substrate is formed with at least three grooves which are arranged along at least one of the two side frame sections and rear frame section and which are opened alternately in opposite thickness directions, said at least three grooves having base walls that hold and supportingly engage the corresponding frame section alternately from upward and downward and forming said void cavity.

[6] The method according to any one of above [2] to [4], wherein step (b) is carried out simultaneously with step (a), wherein step (a) is carried out such that the foamed molded substrate is formed with at least three grooves that are arranged along at least one of the two side frame sections and rear frame section and that are opened alternately in opposite thickness directions, wherein each of said grooves has a base wall and two opposed sidewalls and accommodates the corresponding frame section with said base wall engaging the corresponding frame section, wherein said sidewalls are spaced apart from each other a distance greater than the diameter of the corresponding frame section so that a space is formed adjacent to the corresponding side frame section in each of said at least three grooves, and wherein said at least three grooves are contiguously arranged so that said spaces of said at least three grooves are contiguous to each other and form said void cavity.

The present invention also provides:

[7] A seat core material comprising a foamed molded substrate of thermoplastic resin expanded beads, and a frame member embedded in the periphery of the foamed molded substrate, said foamed molded substrate being provided with a void cavity at a position along and adjacent to the frame member on a foamed molded substrate's shrinkage direction side thereof.

According to the production method of the present invention, the void cavity (or space) formed adjacent to the frame member permits a displacement of the frame member relative to the foamed molded substrate during the shrinkage of the foamed molded substrate after the in-mold molding. Therefore, excess deformation such as bending of the frame member and warp of the foamed molded substrate can be suppressed. Namely, the method allows the production of a seat core material for vehicles that has good dimensional accuracy.

Also, according to the present invention, there is provided a seat core material having excellent dimensional accuracy. The seat core material has a main body formed of a foamed molded substrate of thermoplastic resin expanded beads, and a frame member embedded in the periphery of the main body. The foamed molded substrate, when molded and shrunken, is formed with a void cavity at a position adjacent to the frame member and on a foamed molded substrate's shrinkage direction side.

DETAILED DESCRIPTION OF THE INVENTION

Description will be made in detail of a method for producing a seat core material of the present invention that is used for a vehicular seat element. As used herein the term "vehicle" is intended to refer to a wide range of transport devices such as automobiles, bicycles, airplanes and electric trains. The term "seat element" as used herein is intended to refer to a seat cushion on which an occupant sits and a seat back which supports the back of the occupant. Such a seat element may be obtained by laminating a cushion layer (pad) that is formed of a material having cushioning property, such as polyurethane, on a seat core material. Description will be hereinafter made of a seat core material used in a seat cushion. However, the method of the present invention may be similarly applied to a seat core material for a seat back.

Figure 1:
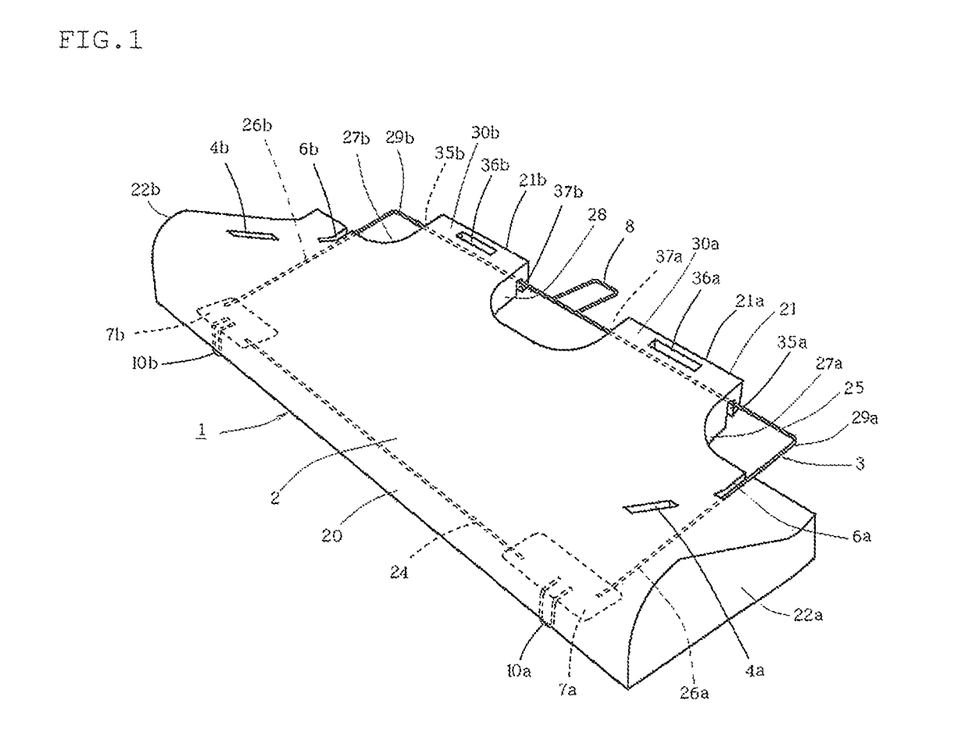
FIG. 1 is a perspective view schematically illustrating one embodiment of a seat core material obtained by a method of the present invention.
Figure 2:
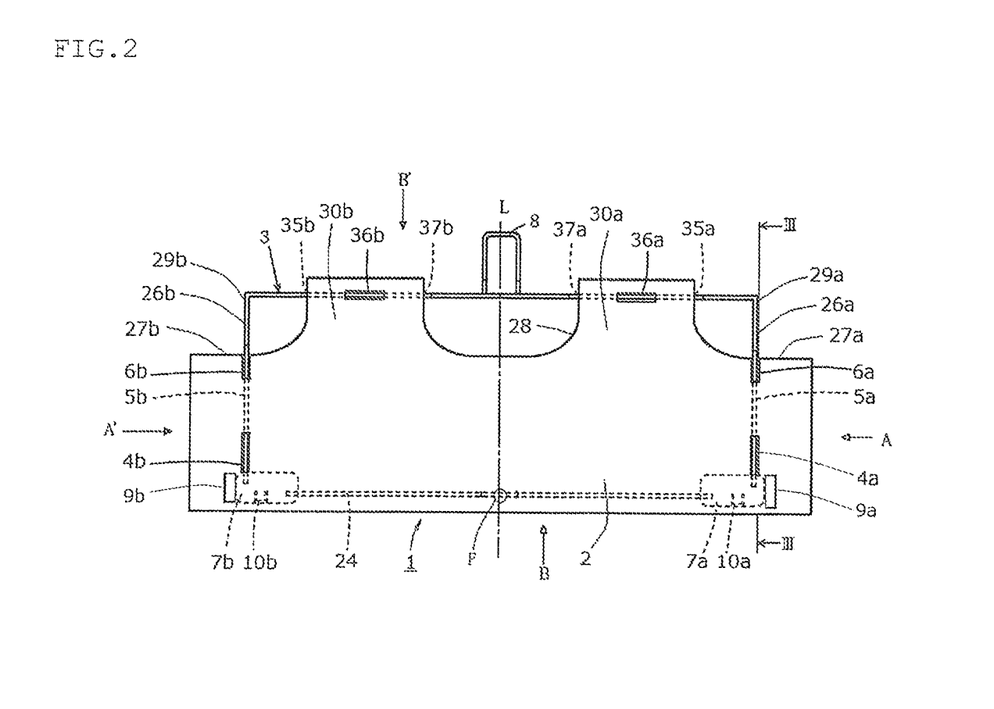
FIG. 2 is a plan view of the seat core material of FIG. 1.

Referring first to FIG. 1 and FIG. 2, the reference numeral 1 donates a seat core material of the first embodiment that has been produced according to the method of the present invention and is used for a vehicular seat cushion for a two-person seat. The seat core material is comprised of a foamed molded substrate 2 (hereinafter occasionally referred to simply as "substrate") and a frame member 3 embedded in a periphery thereof. The seat core material 1 has been produced by a method which includes an in-mold molding step including heating thermoplastic resin expanded beads in a mold cavity, in which the frame member 3 has been disposed, to fusion-bond the expanded beads to each other and to obtain the foamed molded substrate 2 with the frame member 3 being embedded in the periphery thereof (hereinafter referred to as "step (a)"). Namely, the foamed molded substrate 2 is a main body formed of an expanded bead molded article of a thermoplastic resin, while the seat core material 1 is an integrally molded body in which the frame member 3 is embedded in a periphery of the main body. As shown in FIG. 2, the substrate 2 of the seat core material 1 according to the first embodiment is symmetrical with respect to a vertical plane L that generally bisects the substrate 2.

Incidentally, as used herein, "widthwise direction" of the substrate 2 is intended to refer to the widthwise direction of a vehicle on which the seat core material 1 has been installed, "vertical direction" (up-down direction or thickness direction) of the substrate 2 is intended to refer to the vertical direction of the vehicle, and "front to rear direction" of the substrate 2 is intended to refer to the front to rear direction of the vehicle.

The term "embedded" is intended to mean that the frame member is integrated in the substrate and includes not only a case where the frame member 3 is surrounded by and in close contact with the substrate 2, but also a case where the frame member 3 is surrounded by the substrate 2 via void cavity (or space) that is formed in a part or entire periphery of the frame member 3. It is not necessary that the whole length along the axis of the frame member 3 should be embedded in the substrate 2; i.e. a part of the frame member 3 may be exposed outside the substrate 2. Thus, the term "embedded along a periphery of the substrate 2" is intended to include, for example, a case where, as shown in FIG. 1 and FIG. 2, three sides of the looped frame member 3 and a part of the remaining one side thereof are embedded along a periphery of the substrate. It is preferred that a movement of the frame member 3 embedded in the substrate 2 in a direction roughly perpendicular both to the shrinking direction of the substrate 3 and to the axial direction of the frame member is suppressed. For instance, when the shrinking force of the substrate 2 which acts on the frame member 3 is mainly in a widthwise direction, the frame member 3 is preferably embedded in the substrate 2 in such a state that the frame member 3 is sandwiched by the substrate 2 at opposed position in the vertical direction of the frame member 3, and the frame member is preferably supported by the substrate from up-down direction.

As the thermoplastic resin expanded beads used in the above step (a), there may be generally used expanded beads of a polyolefin-based resin such as polyethylene and polypropylene, a polystyrene-based resin, a polyester resin such as polylactic acid resin, a polycarbonate-based resin or a mixed resin containing a polyolefin-based resin and a polystyrene resin, though any known expanded beads may be used. Incidentally, the molding shrinkage rate of non-crystalline resins is generally 0.001 to 0.009, while that of crystalline resins is 0.003 to 0.04. The effect of prevention of deformation is significantly shown in the present invention, when crystalline resin expanded beads such as of polyolefin resins, which are apt to cause shrinkage, are used.

Among the above-described expanded beads, it is preferable to use expanded beads of a polyolefin-based resin or a mixed resin of a polyolefin-based resin with a polystyrene-based resin from the standpoint of strength and impact resistance. As the polyolefin-based resin, a polypropylene-based resin and a polyethylene-based resin are preferred. The use of polyolefin-based resin expanded beads makes it easy to produce a substrate having specific compressive elasticity.

The substrate 2 suitably has an apparent density of 20 g/L to 200 g/L. The substrate 2 having an apparent density in the above range can provide a vehicular seat core material having excellent strength and impact resistance and excellent holding property for the frame member 3. From the above point of view, the apparent density of the substrate 2 is preferably 25 g/L to 100 g/L, more preferably 30 g/L to 80 g/L.

The substrate 2 may be constituted of a foamed molded body having the same uniform apparent density. Alternately, the substrate may be formed of a composite substrate in which a plurality of expanded beads foamed bodies having different apparent densities are used in combination. Such a composite substrate is acceptable as long as the average apparent density thereof falls within the above-described range. As used herein the term "apparent density" is as measured by a water-immersion method in which the density is calculated from an increase of the volume when a sample substrate is immersed in water.

The frame member 3 that is embedded along a periphery of the substrate 2 is used primarily to improve the strength of the seat core element 1, but else it is used to secure connecting metal fittings for a vehicle body or to secure a skin material such as a cushion cover.

The seat core material 1 shown in FIG. 1 and FIG. 2 is prepared using, as the frame member 3, an annular or looped frame structure which has a roughly rectangular shape and which is composed of a linear wire material and a U-shaped wire material. The step (a) of the method for producing the seat core material 1 shown in FIG. 1 and FIG. 2 is carried out such that the foamed molded substrate 2 is formed with a front end 20, a rear end 21 and two side ends 22a and 22b. In this case, a front frame section 24 which is the above-mentioned linear wire material is embedded in the substrate 2 along the front end 20, and two side frame sections 26a and 26b and rear frame section 25, which are constituents of the above-mentioned U-shaped wire material, are embedded in the substrate 2 at positions spaced apart inward from the two side ends 22a and 22b and rear end 21, respectively, by a predetermined distance, generally 20 to 100 mm.

The linear and U-shaped wire materials are connected to each other by plate portions 7a and 7b. To the plate portions 7a and 7b, hook members 10a and 10b are optionally connected, respectively. The hook members 10a and 10b have their tip ends protruded from the bottom surface of the substrate 2 and configured to be fixed to fixing portions of the vehicle (not shown) when the seat core material 1 is mounted on the vehicle. Further, to a middle portion of the rear frame section 25 is fixed a coupling protrusion (hook) 8 made of a metal and used for connection to a back seat. The linear and U-shaped wire materials of the annular frame structure used as the frame member 3 may be directly connected to each other without using the plate portions 7a and 7b. Alternately, the annular frame structure may be constituted of a looped wire material formed from one wire material.

As a material of the frame member 3, there may be mentioned, for example, a metal (including an alloy) such as iron, aluminum and copper, and a resin. These materials have a lower degree of shrinkage than the substrate 2. From the standpoint of strength of the seat core material 1, the frame member 3 is preferably made of a metal and particularly preferably made of steel.

As the frame member 3, any material, such as a hollow pipe, a solid bar or a wire material, having any cross-sectional shape, such as a circular shape, a rectangular shape, an oval shape or a polygonal shape, may be used. The material may be selected as appropriate with consideration of the kind and shape of the seat element. Hitherto, when a seat is formed only by an urethane foam and a frame member, a large diameter heavy frame wire has been used as the frame member for reasons of maintaining the strength thereof. When a foamed molded substrate 2 having a certain degree of strength is used, however, a desired strength of the seat core material as a whole may be obtained even when a light weight wire material having a relatively small diameter is used as the frame member 3.

From the standpoint of the strength of the seat core material 1, it is preferred that a wire material (solid pipe) or a hollow pipe, especially a wire material having a diameter of 2 mm to 8 mm is used as the frame member 3. The diameter of the wire material or hollow pipe is more preferably 3 mm to 7 mm, still more preferably 3.5 mm to 6 mm. The wire material preferably has a tensile strength of 200 N/mm$^2$ or more. From the standpoint of improvement of the strength of the seat core material 1, the tensile strength is preferably 250 N/mm$^2$ to 1,300 N/mm$^2$. The wire material preferably has a yielding point of 400 N/mm$^2$ or more, more preferably 440 N/mm$^2$ or more. The physical properties of the wire material may be measured according to JIS G3532.

When a small diameter frame member 3 is used from the standpoint of reduction of the weight of the seat core material 1, the frame member 3 is more liable to receive an influence of shrinkage of the substrate 2. In such a case, the effect of the present invention becomes more significant.

Incidentally, when the substrate 2 of a thermoplastic resin and the frame member 3 such as of a metal are integrally molded, deformation such as bending of the frame member 3 and warping of the substrate 2 is liable to occur after the molding because of a large difference in degree of shrinkage therebetween.

The production method of the present invention further includes a step of forming a void cavity in the substrate (2) at a position along and adjacent to the frame member 3 simultaneously with step (a) or after step (a) (hereinafter referred to as step (b)). It is important that the void cavity has a size and shape that allows a relative displacement between the frame member 3 and the substrate (2) when the substrate (2) shrinks after step (b).

In step (b), the void cavity is formed in the seat core material 1 having the frame member 3 embedded in the substrate 2 at a position along and adjacent to the frame member 3 and on an opposite side from a shrinkage direction side of the substrate 2.

More specifically, a void cavity is formed on each outer side, in the widthwise direction, of the front frame section 24 embedded along the front part of the substrate 2, as shown in FIG. 2. In each of the side frame sections 26a and 26b and rear frame section 25, on the other hand, a void cavity is formed on an outer side thereof.

When the void cavity is formed in the step (b) simultaneously with the step (a) (namely at the time the substrate 2 having the frame member 3 embedded therein is molded in a mold cavity) or after the step (a) and when the substrate 2 shrinks thereafter, the void cavity serves as a clearance for the frame member 3 during the course of shrinkage of the substrate 2. As a result, those portions of the substrate 2 which surround the frame member 3 can shrink in the same degree as the other portions thereof. If such a void cavity is not present, on the other hand, there is a possibility that a force acts between the substrate 2 and the frame member 3, which results in the bending of the frame member 3 or deformation of the substrate 2 due to non-uniform shrinkage.

Incidentally, the term "after step (a)" as used herein is intended to mean a period after the formation of the substrate 2 having the frame member 3 embedded therein until before occurrence of substantial shrinkage. Specifically, it is preferred that the void cavity is formed before the start of shrinkage of the substrate 2 in the elastic deformation region of the frame member 3 or during the shrinkage thereof without delay. More specifically, the void cavity is preferably formed within 60 minutes after completion of the steam heating in the case of polypropylene-based resin foamed molded substrate. Incidentally, it is not necessary that the void cavity be formed in the entire embedded region. It is preferable to form the void cavity to such an extent that the deformation of the substrate 2 and the frame member 3 can be suppressed.

In the seat core material after shrinkage, namely in the final product of the seat core material produced by the manufacturing process of the present invention, a void cavity having a size corresponding to the amount of the shrinkage is formed on a substrate 2's shrinkage direction side at a position along and adjacent to the frame member 3 as a result of the relative movement of the frame member 3 caused by the shrinkage of the substrate 2.

The direction and degree of shrinkage of the substrate 2 can be known by observing the state of shrinkage of a substrate separately produced in a preliminary test. Alternatively, the direction of shrinkage and the amount of displacement can be predicted by, for example, determining a reference point F with zero shrinkage at a position near the longitudinal center of the front frame section 24 where the substrate 2 does not shrink much as shown in FIG. 2 and assuming that the substrate 2 shrinks toward this fixed portion F. In other words, because the amount of displacement at each point of the substrate 2 due to shrinkage thereof is proportional to its distance from the fixed portion F, an approximate amount of displacement at each point can be predicted from the distance and the rate of shrinkage of the substrate 2. Then, when a void cavity with a size corresponding to the predicted amount of displacement is provided around the frame member 3, the shrinking force that the frame member 3 receives can be reduced. The void cavity is preferably formed in the substrate 2 at a position along the frame member preferably at a distance of 5 to 20 mm, more preferably at a distance of 6 to 15 mm, from the frame member on the side opposite the substrate 2's shrinkage direction side of the frame member.

Step (b) of forming a void cavity at a position along and adjacent to the frame member 3 on the side opposite the substrate 2's shrinkage direction side may be carried out after the completion of step (a) (for example, immediately after the formation of the substrate 2) using a tool such as a cutter, or may be carried out simultaneously with step (a) (simultaneously with the formation of the substrate 2) using a molding device configured to form a void cavity. For example, a pair of openable and closable male and female molds configured, when in a closed position, to form a mold cavity consistent in shape with the substrate 2 having a desired shape including a void cavity with a predetermined shape at a predetermined position may be used to form a void cavity simultaneously with the formation of the substrate 2. In other words, the substrate 2, which has a void cavity along and adjacent to the frame member 3, can be obtained by preliminarily placing a frame member 3 at a predetermined position in the mold, filling the mold cavity with expanded beads after closing the mold, performing in-mold molding by applying heat, and then opening the mold. In this case, when a pair of openable and closable male and female molds having a plate-shaped protrusion for forming a void cavity is used to form a void cavity extending along the frame member 3, an elongated and relatively deep groove (or recess) opened in a surface of the substrate 2 and extending along the frame member 3 is unavoidably formed in the substrate 2. If a groove is opened along the frame member 3 only in one of the both surfaces of the substrate 2 obtained by in-mold molding, the frame member 3 adjacent to the groove may not be fixed in a sufficiently stable state in the substrate 2. Thus, it is preferred to form a void cavity by forming multiple grooves which are opened alternately in opposite directions along the frame member 3 as described below.

When step (b) is performed simultaneously with step (a), it is preferred that step (b) is carried out in such a way that the foamed molded substrate is formed with at least three contiguous grooves which are arranged along and adjacent to at least one of the two side frame sections 26a and 26b and the rear frame section 25 and which are opened alternately in opposite thickness directions, since the frame member 3 can be embedded in a sufficiently stable state in the substrate 2.

Figure 3:
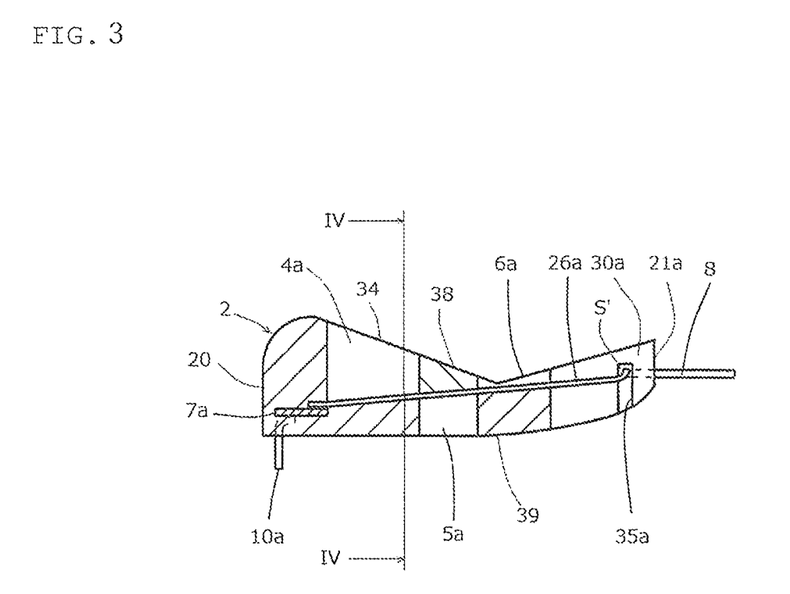
FIG. 3 is a cross-sectional view taken along the line III-III in FIG. 2.
Figure 4:
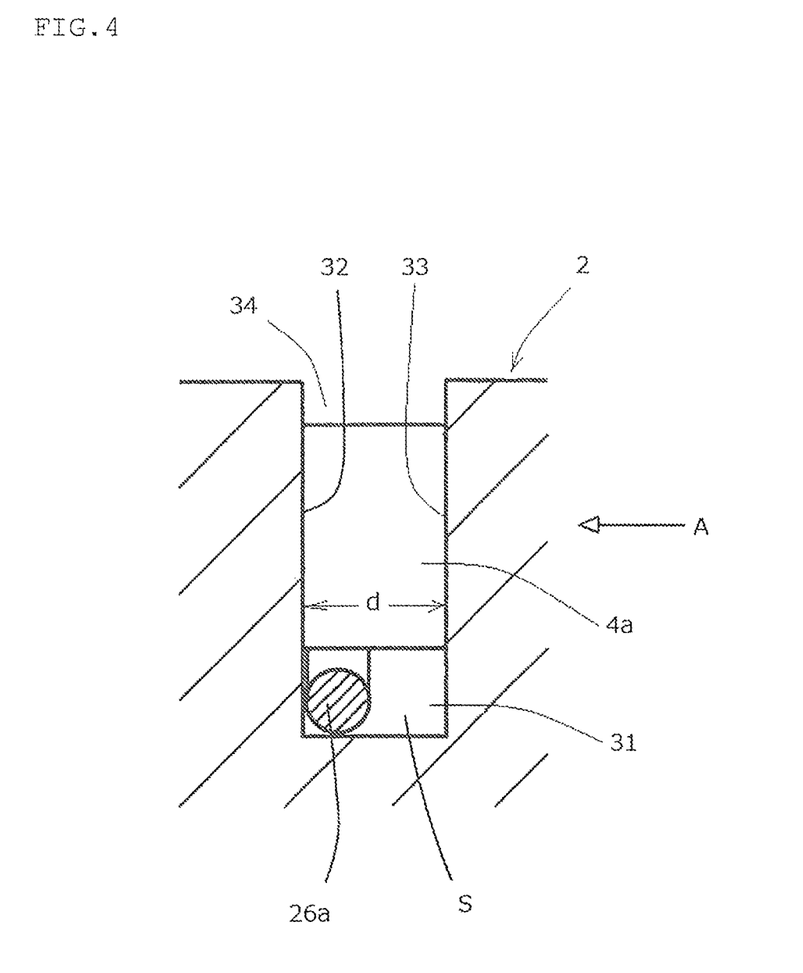
FIG. 4 is a cross-sectional view taken along the line IV-IV in FIG. 3.

FIG. 1 and FIG. 2 show an example of a seat core material having three contiguous grooves as described above formed along each of the two side frame sections 26a and 26b and the rear frame section 25 in step (b). Referring to FIG. 3 and FIG. 4, three contiguous grooves 4a, 5a and 6a formed along the side frame section 26a at the right end 22a side in the substrate 2 are described. The following description, however, also applies to the grooves formed along the other side frame section 26b and the rear frame section 25. As shown in FIG. 3, the grooves 4a, 5a and 6a are opened alternately in opposite thickness directions. In other words, the grooves 4a and 6a are opened in a top surface 38 of the substrate 2, and the groove 5a is opened in a bottom surface 39 of the substrate 2. As shown in FIG. 4, the groove 4a has a base wall 31, two opposed sidewalls 32 and 33, and an opening 34, and accommodates the corresponding frame section (the side frame section 26a in the example shown in FIG. 4) with the base wall 31 engaging the side frame section 26a (the grooves 5a and 6a are constituted in the same manner as the groove 4a). In other words, as shown in FIG. 3, the openings 34 of the adjacent grooves 4a, 5a and 6a are formed in opposite directions, and the bottoms 31 of the three grooves 4a, 5a and 6a supportingly engage the side frame section 26a alternately from upward and downward at three positions. In other words, each of the grooves 4a, 5a and 6a constitutes a locking portion that holds a part of the side frame section 26a.

The opposed sidewalls 32 and 33 of each of the grooves 4a, 5a and 6a are spaced apart from each other at a distance greater than the diameter of the side frame section 26a. In other words, as shown in FIG. 4, the opposed sidewalls 32 and 33 are formed to be spaced apart from each other at a distance d that is preferably 6 to 28 mm, more preferably 7 to 23 mm, greater than the thickness of the side frame section 26a. Thus, a space S is formed adjacent to the side frame section 27, in other words, at the right end side thereof in the widthwise direction of the substrate 2. The three grooves 4a, 5a and 6a are contiguously arranged so that the three spaces S of the grooves are contiguous to and communicated with each other. Thus, the three spaces S of the grooves 4a, 5a and 6a constitute a void cavity S extending along the side frame section 26a as a whole. Thus, the space S of each of the grooves 4a, 5a and 6a is formed at least on the side opposite the arrow A direction side with respect to the side frame section 26a, wherein the arrow A direction is the shrinkage direction of the substrate 2 (FIG. 4). As shown in FIG. 3, the side frame section 26a (and the side frame section 26b as well) is provided to be inclined in the front to rear direction, and the base walls 31 of the grooves 4a, 5a and 6a are also inclined accordingly. As described above, the base walls of the grooves 4a, 5a and 6a are configured to supportingly engage the side frame section 26a alternately from opposite thickness directions. Thus, the grooves 4a, 5a and 6a form a continuous hole extending in the axial direction of the side frame section 26a with the side frame section 26a being embedded and held in the hole. In this specification, the space formed in each of the at least three grooves is referred to as "space S (or S')," and the void space extending continuously through these spaces along the corresponding frame section as a whole is referred to as "void cavity S (or void cavity S')."

Figure 5:
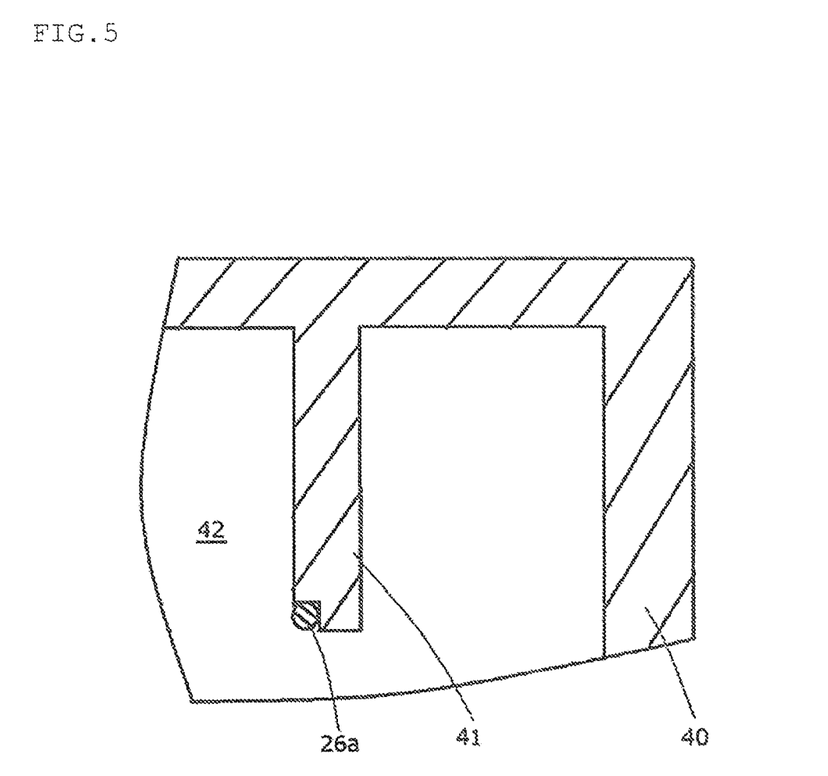
FIG. 5 is a fragmentary cross-sectional view schematically illustrating a molding device for forming a groove of the seat core material shown in FIG. 4.

FIG. 4 is a cross-sectional view taken along the line IV-IV in FIG. 3. FIG. 2 and FIG. 4 show a state immediately after the formation of the substrate 2 where the substrate 2 has not undergone a significant shrinkage yet, whereas FIG. 1 and FIG. 3 show a state where the substrate 2 has undergone shrinkage. FIG. 5 is a fragmentary cross-sectional view illustrating one example of openable and closable male and female molds used to produce the substrate 2 shown in FIG. 1 to FIG. 4, and corresponds to FIG. 4. Designated by a reference numeral 40 is a mold configured to form a mold cavity 42 having the same shape as the substrate 2. The mold 40 has a plate-shaped protrusion 41 to form the groove 4a in the substrate 2. In other words, the plate-shaped protrusion 41 has the same shape as the groove 4a.

With the above configuration, the side frame section 26a is held between the base walls of the grooves 4a, 5a and 6a and restricted from moving in the vertical direction but is allowed to make a relative displacement within the range of the void cavity S. Thus, when the substrate 2 shrinks in the arrow A direction, the void cavity S allows a displacement of the side frame section 26a in a direction opposite the shrinkage direction. Because the side frame section 26a is allowed to displace relative to the substrate 2 within the range of the void cavity when the substrate 2 shrinks in the arrow A direction in FIG. 2 and FIG. 4, the shrinking force exerted on the side frame section 26a can be reduced to prevent the substrate 2 and the side frame section 26a from being deformed.

After the shrinkage of the substrate 2 is completed, the void cavity is located on the arrow A direction side of the side frame section 26a because the side frame section 26a has been displaced in a direction opposite the arrow A direction relative to the substrate 2.

It is contemplated that the part of the substrate 2 which is located in the vicinity of the front end 20 thereof and in which the front frame section 24 is embedded hardly displaces in the arrow B direction in FIG. 2 but shrinks in the arrow A direction and the arrow A' direction, the widthwise direction of the substrate 2. When void cavities are formed on the outer sides, in the widthwise direction of the substrate 2, of the linear front frame section 24, the void cavities allow a relative displacement between the front frame section 24 and the substrate 2 when the substrate 2 shrinks in the widthwise direction, i.e., in the axial direction of the front frame section 24. However, in the example shown in FIG. 1 and FIG. 2, the plate portions 7a and 7b are provided at opposite ends of the front frame section 24. Thus, void cavities 9a and 9b (see FIG. 2) are respectively formed on outer sides, in the widthwise direction, of the plate portions 7a and 7b so that the plate portions 7a and 7b may not interfere with the displacement of the front frame section 24. In this way, a relative displacement of the front frame section 24 is also allowed. When the hook portions 10a and 10b are also provided, void cavities (not shown) are provided on outer sides, in the widthwise direction, of the hook portions 10a and 10b as appropriate. When the front frame section 24 has bends, it is preferred to provide a void cavity on the outer side in the longitudinal direction of each bend.

As shown in FIG. 2, grooves 4b, 5b and 6b are also formed adjacent to the side frame 26b at the left end 22b side of the substrate 2 in the same manner as shown in FIG. 3 and FIG. 4 in step (b). However, in the grooves 4b, 5b and 6b on the left side, a void cavity S is formed on the outer side of the side frame 26b supported to allow a relative displacement of the side frame 26b when the substrate 2 shrinks toward its center (in the arrow A' direction).

Step (b) is preferably carried out such that grooves similar to those as shown in FIG. 3 and FIG. 4 are formed at the rear end 21 side of the substrate 2 along the rear frame section 25 to form a groove S.

Step (a) is preferably carried out in such a way that the substrate 2 is additionally formed with two rear corner recesses 27a and 27b and interconnected portions 29a and 29b between the two side frame sections 26a and 26b and the rear frame section 25 are completely exposed from the substrate 2 at the respective rear corner recesses 27a and 27b as shown in FIG. 2. The substrate 2 undergoes a relatively large change in dimensions in the vicinity of the rear end 25, which is far away from the above-mentioned fixed portion F. The recesses (cut-outs) 27a and 27b formed at the rear corners of the substrate 2 can help to reduce the shrinking force that is exerted on the rear frame section 25 when the substrate 2 shrinks. It should be noted here that seat belts of the vehicle may be installed at rear corners of the seat. In this case, when the rear corner recesses 27a and 27b have been provided, there is no need to cut out some portions of the substrate 2 for installation of the seat belts or to form holes for the seat belts afterword.

Step (a) is preferably carried out such that a rear center recess 28 is formed between the rear corner recesses 27a and 27b in addition to the two rear corner recesses 27a and 27b as shown in FIG. 1 and FIG. 2. As a result of the formation of the rear center recess 28, the rear end 21 between the rear corner recesses 27a and 27b is divided into two parts 21a and 21b. The substrate 2 has a pair of slightly sloped supporting portions (raised portions) 30a and 30b for the rear frame section 25 at positions adjacent to the rear end parts 21a and 21b. In this case, as can be apparent from FIG. 1 and FIG. 2, the rear frame section 25 is embedded and supported in the substrate 2 at positions spaced inward from the two rear end parts 21a and 21b (i.e., in the supporting portions 30a and 30b) and completely exposed from the substrate 2 at the rear center recess 28. Each of the supporting portions 30a and 30b is configured to be couplable to a back seat (not shown) and functions as a coupling section.

Step (b) is preferably carried out such that at least three contiguous grooves 35a, 36a and 37a opened alternately in opposite directions and at least three contiguous grooves 35b, 36b and 37b opened alternately in opposite directions are formed along and adjacent to the rear frame section 25 in the supporting portions 30a and 30b, respectively, of the substrate 2 in the same manner as the grooves along the side frame sections 26a and 26b. In the following, description is made of one supporting portion 30a, but the description also holds true for the other supporting portion 30b. The base walls of the three grooves 35a, 36a and 37a in the supporting portion 30a are preferably formed to engage the rear frame section 25 alternately from upward and downward at three positions. The base walls may not engage the rear frame section 25 but be located in the vicinity of the rear frame section 25. Each of the grooves 35a, 36a and 37a has opposed sidewalls spaced apart from each other at a distance greater than the diameter of the rear frame section 25 so that a space S' is formed adjacent to the rear frame section 25 in each groove. Because the grooves 35a, 36a and 37a are formed contiguously, the spaces S' of the grooves 35a, 36a and 37a are continuous to each other and form a void cavity S' as a whole in the form of a through hole extending along the rear frame section 25.

When the base walls of the grooves 35a, 36a and 37a are located in the vicinity of the rear frame section 25, a gap is also formed above or below the rear frame section 25 in each groove. In addition, gaps are also formed on the right and left sides of the rear frame section 25 when the substrate 2 shrinks. The spaces S', which allow a relative displacement of the rear frame section 25, are preferably formed around the rear frame section 25 as shown in FIG. 3. The void cavity S', which is a collection of the spaces S' of the groove 35a, 36a and 37a in the supporting portion 30a, is provided in size and position that allows the rear frame 25 to displace in any direction. In other words, the rear frame section 25 in the void cavity S' can displace in the front to rear direction of the substrate 2, in the vertical direction, which is the thickness direction of the substrate 2, and in the right-left direction, which is the widthwise direction of the substrate 2, relative to the substrate 2.

As described above, at least three grooves opened alternately in opposite directions are formed so that the rear frame section 25 is held between the base walls of the grooves in each of the supporting portions 30a and 30b. Thus, the rear frame section 25 can be supported in the grooves with a void cavity S' formed around the rear frame section 25. This configuration allows a relative displacement of the rear frame section 25 to prevent the rear frame section 25 and the substrate 2 from being deformed when the substrate 2 shrinks. In addition, the supporting portions 30a and 30b enhance the integrity between the substrate 2 and the rear frame section 25. This makes the entire seat core material 1 less likely to be distorted and improves the handleability of the seat core material 1.

The reason for the formation of a void cavity S' that allows a relative displacement of the rear frame section 25 in any direction along the rear frame section 25 in each of the supporting portions 30a and 30b is as follows. As shown in FIG. 1 and FIG. 3, each of the supporting portions 30a and 30b is sloped upward at the rear of the substrate 2 and has a non-constant thickness. Thus, the supporting portions 30a and 30b shrink primarily in some direction between the arrow B' direction, which is the front to rear direction of the substrate 2, and the thickness direction of the substrate 2. It is, therefore, difficult to predict the direction and amount of shrinkage of the supporting portions 30a and 30b accurately. If the direction of shrinkage of the substrate 2 at the supporting portions 30a and 30b can be predicted accurately, the size of each void cavity S' necessary to allow a relative displacement of the rear frame section 25 in a direction opposite the shrinkage direction can be minimum. In reality, however, it is difficult to predict accurately the direction and amount of shrinkage in parts with a complicated shape, such as the supporting portions 33 and 34. Thus, the space S', which is large enough to surround the entire circumference of the rear frame section 25, is formed in each of the grooves 35a, 36a, 37a, 35b, 36b and 37b to provide void cavities S' that allows a relative displacement of the rear frame section 25 in any direction.

As described above, the rear center recess 28 is formed between the supporting portions 30a and 30b at the rear side of the substrate 2 to expose the rear frame section 25 from the substrate 2. The rear center recess 28 does not receive the shrinking force from the substrate 2 and therefore contributes to reducing the influence of the shrinking force on the rear frame section 25. A coupling protrusion 8 may be formed on the rear frame section 25 exposed in the rear center recess 28. In this case, the coupling protrusion 8 is unlikely to be influenced by shrinkage of the substrate 2 and can maintain its positional accuracy. When the substrate 2 is formed with the rear center recess 28 and the rear corner recesses 27a and 27b, the seat core material itself can be lighter in weight.

In addition, because the supporting portions 30a and 30b are formed between the rear corner recesses 27a and 27b, the influence of the shrinking force on the rear frame section 25 can be reduced while maintaining the integrity between the rear frame section 25 and the substrate 2. This improves the handleability of the seat core material 1. Further, because a void cavity that allows a relative displacement of the rear frame section 25 is formed on the side opposite the substrate 2's shrinkage direction side of the rear frame section 25 in each of the supporting portions 30a and 30b, the rear frame section 25 can displace relative to the substrate 2 in a direction opposite the shrinkage direction of the substrate 2 in the void cavity when the substrate 2 shrinks. This prevents the supporting portion 30a and 30b and the rear frame section 25 from being deformed by the shrinkage of the substrate 2.

The number of grooves provided to form each void cavity S or S' that allows the frame member 3 to displace relative to the substrate 2, such as the grooves 4a, 5a, 6a, 4b, 5b, 6b, 35a, 36a, 37a, 35b, 36b and 37b, is not limited. Usually, when three or more, preferably three to five, grooves opened alternately in opposite directions are contiguously formed along each axial direction of the frame member 3, the base walls of the grooves support the frame member 3 from both sides and the frame member 3 can be held stably even when the void cavity is larger in size.

Figure 6:
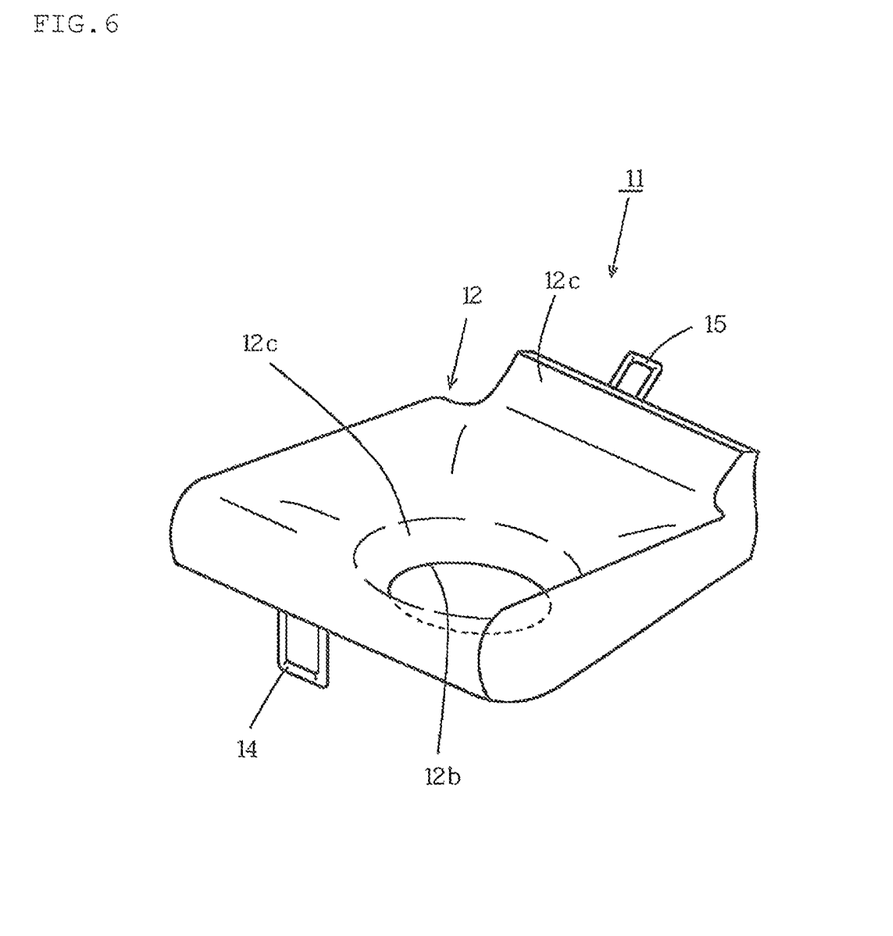
FIG. 6 is a perspective view schematically illustrating another embodiment of a seat core material obtained by a method of the present invention.
Figure 7:
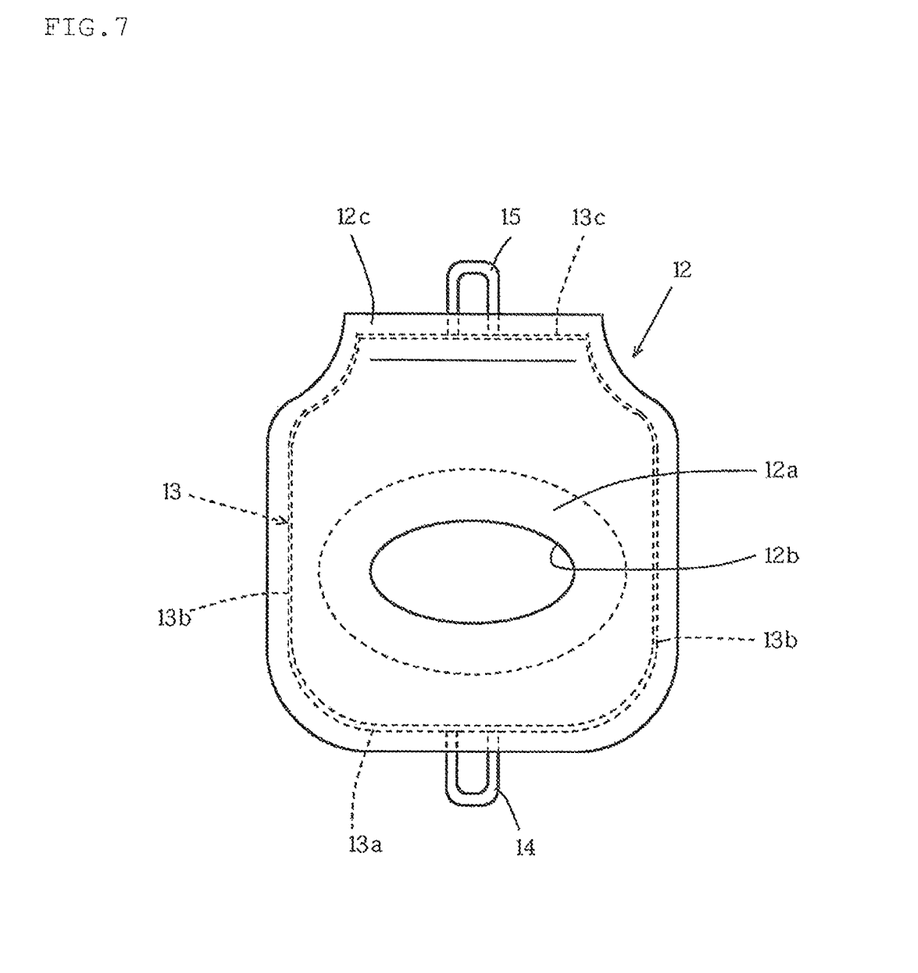
FIG. 7 is a plan view of the seat core material of FIG. 6.

FIG. 6 and FIG. 7 show a seat core material 11 produced by the method of the present invention that is used in a seat member for one person as a second embodiment. The seat core material 11 includes a substrate 12 which is different in shape from the substrate 2 of the first embodiment but produced by in-mold molding of expanded beads in the same manner as in the first embodiment. A frame member 13 is embedded along the periphery of the substrate 12 (see FIG. 7). The materials, shapes and configurations of the substrate 12 and the frame member 13 and the method for forming the seat core material 11 are the same as those in the first embodiment described in connection with FIG. 1 to FIG. 4.

The substrate 12 has a large thickness at a portion that will be located at the front when the resulting seat member is attached to a vehicle, and has a recess 12a at a position corresponding to the buttocks of the passenger seated. A hole 12b extending in the thickness direction of the substrate 12 is formed through the center of the recess 12a. In addition, a coupling portion 12c that will be connected to a back seat (not shown) is raised at a rear end of the substrate 12.

The frame member 13 of the second embodiment is embedded in the substrate 12 along the contour thereof. The frame member 13 includes a front frame section 13a having a hook portion 14 to be hooked with a locking portion on the vehicle side at a position corresponding to the center of the front end of the substrate 12. The hook portion 14 has a distal end protruding from a bottom surface of the substrate 12. The frame member 13 also includes a rear frame section 13c having a coupling protrusion 15 provided at a position corresponding to the center of the rear end of the substrate 12 and protruding rearward. The coupling protrusion 15 is a member used to couple the seat member to a back seat. As indicated by broken lines in FIG. 7, the frame member 13 is a frame structural body obtained by joining both ends of one wire material into a generally rectangular loop-like configuration. The front frame section 13a, provided with the hook portion 14, is embedded in the substrate 12 having void cavities formed at opposite ends of the front frame section 13a in the widthwise direction.

The frame member 13 of the second embodiment is embedded in the substrate 12 having void cavities formed at opposite ends of a straight portion of the front frame section 13a in the widthwise direction of the substrate 12. On the other hand, a predetermined void cavity (not shown) is formed at a position along and adjacent to each of a pair of left and right side frame sections 13b and 13b embedded at both sides of the substrate 12 and the rear frame section 13c on at least the outer side thereof as in the first embodiment described above. These void cavities allow the side frame sections 13b and 13b and the rear frame section 13c to displace relative to the substrate 12 to reduce the shrinking force exerted on the frame member 13 from the substrate 12 when the substrate 12 shrinks after the formation. Thus, again in this second embodiment, the void cavities can reduce the shrinking force exerted on the frame member 13 to prevent the substrate 12 from warping and the frame member 3 from being deformed.

In addition, in this second embodiment, a hole 12b is formed at the center of the buttock-receiving recess 12a of the substrate 12. The hole 12b helps to reduce the volume of the foamed molded substrate that shrinks in the substrate 12 and to decrease the amount of shrinkage in each part of the substrate 12. As a result, the shrinking force that is exerted on the frame member 13 can be reduced, and the frame section 13 can be prevented from being deformed by the shrinkage of the substrate 12. Although the hole 12b is formed at a position corresponding to the buttocks of the passenger seated, the shape and seating comfort of a seat member with the seat core material 11 incorporated therein can be prevented from being impaired by placing a pad on it. The hole 12b may be either a through hole or a hole with a base wall.

Then, the influence of the shrinking force on the frame member 13 decreases and the seat core material 11 is lighter in weight as the opening area of the hole 12b is greater. For example, the rate of the opening area of the hole 12b to the area of the region surrounded by the outer periphery of the substrate 12 is preferably 30% to 70%, in which case the influence of the shrinking force on the frame member 13 can be reduced and the seat core material 11 can be light in weight and have high strength. The hole 12b is not limited to a seat core material for a seat member for one person, such as the seat core material of the second embodiment. Such a hole can provide similar effects even when formed in a seat core material for two persons, such as the seat core material of the first embodiment.

The seat core material of the present invention is comprised of a foamed molded substrate of thermoplastic resin expanded beads, and a frame member embedded in a periphery of the foamed molded substrate. In the foamed molded substrate, a void cavity is formed at a position along and adjacent to the frame member on a foamed molded substrate's shrinkage direction side thereof. In the seat core material obtained immediately after the production method of the present invention 3, however, a void cavity is formed on the side opposite the substrate's shrinkage direction side of the frame member. When the frame member is thereafter displaced relative to the substrate as a result of the shrinkage, a space is formed in the displaced portion on a side toward which the substrate has been displaced relative to the frame member.

EXAMPLE

The present invention will next be further described by way of Example and Comparative Example.

Example 1

A seat core material 1 of the first embodiment shown in FIG. 1 to FIG. 4 was prepared.

(1) Frame Member

As the frame member 3, a roughly rectangular wire structure was used. The wire structure had a linear wire material as the front frame section 24 and a U-shaped wire material as the rear frame section 25 and two side frame sections 26a and 26b, which wire materials were connected to each other by two plate portions 7a and 7b. Each wire material had a diameter of 4.5 mm and a tensile strength (JIS G3532 SWM-B) of 500 N/mm$^2$ and was made of steel. Each of the side frame sections had a length of 400 mm and the front frame section had a length of 800 mm. Each of the plate portions 7a and 7ab was made of an iron plate having a thickness of 1.2 mm, longitudinal length of 80 mm and a lateral length of 170 mm. Hook members 10a and 10b made of the same wire material as above were connected to the plate portions 7a and 7b. The coupling protrusion 8 made of the same wire material as above was fixed at the center of the rear frame section 25.

(2) Molding device

A pair of male and female molds which were able to be opened and closed were used. A mold cavity defined by the male and female molds in a closed state was sized to have a longitudinal (corresponding to the widthwise direction of the substrate 2) length of 1,230 mm, a length in the front to rear direction of 560 mm, a maximum thickness of 200 mm and a thickness of the front end 20 of 90 mm. The mold cavity was configured such that the in-mold molding was able to produce a substrate 2 provided with two rear corner recesses 27a and 27b, a rear center recess 28, grooves 4a, 5a, and 6a, grooves 4b, 5b and 6b, grooves 35a, 36a and 37a, and grooves 35b, 36b and 37b. Immediately after the in-mold molding, these grooves provided the substrate with void cavities having a width of about 10 mm at positions adjacent to the outer sides of the side frame sections 26a and 26b and rear frame sections 25. The mold cavity was also configured to provide the substrate 2 with void cavities at positions outwards of the hook members 10a and 10b and plate portions 7a and 7b.

(3) Expanded Beads

Polypropylene expanded beads having an apparent density of 0.024 g/cm$^3$ were prepared.

(4) In-Mold Molding

The frame member 3 was placed in the mold device such that the hook members 10 and 10b were located at both sides of the front end of the seat core material 1. After the mold device was closed, the expanded beads were filled in the mold cavity and heated with steam to fusion-bond the expanded beads to each other, thereby forming the seat core material 1 having a shape as shown in FIG. 1. In the steam heating step, steam was fed for 5 seconds for preheating (air purging step) while maintaining drain valves on both side molds in an open state and, thereafter, full heating was carried out by feeding steam from both sides at a molding steam pressure of 0.3 MPa(G). Before the full heating, heating was carried out from one side at a pressure lower by 0.08 MPa(G) than the molding steam pressure and then carried out from the other side at a pressure lower by 0.04 MPa(G) than the molding steam pressure. The symbol G indicates the gauge pressure.

After completion of the steam heating step, air cooling was carried out for 30 seconds and water cooling was carried out for 240 seconds. Then the molding device was opened to take the seat core material 1 out thereof. This was aged at 60° C. for 12 hours. The substrate 2 after the aging had a density of 0.03 g/cm$^3$. In the substrate 2, hook members 10a and 10b were located at positions spaced apart leftward and rightward a distance of 500 mm from the center in the longitudinal direction of the front side of the substrate. In the seat core material 1 obtained immediately after the in-mold molding, a void cavity having a width of about 10 mm from the frame member 3 toward the direction opposite the shrinkage direction was found to be formed along and adjacent to the frame member 3.

Comparative Example 1

A seat core material was obtained in the same manner as that in Example 1 except that no void cavities were formed around the periphery of the frame member 3.

Figure 8:
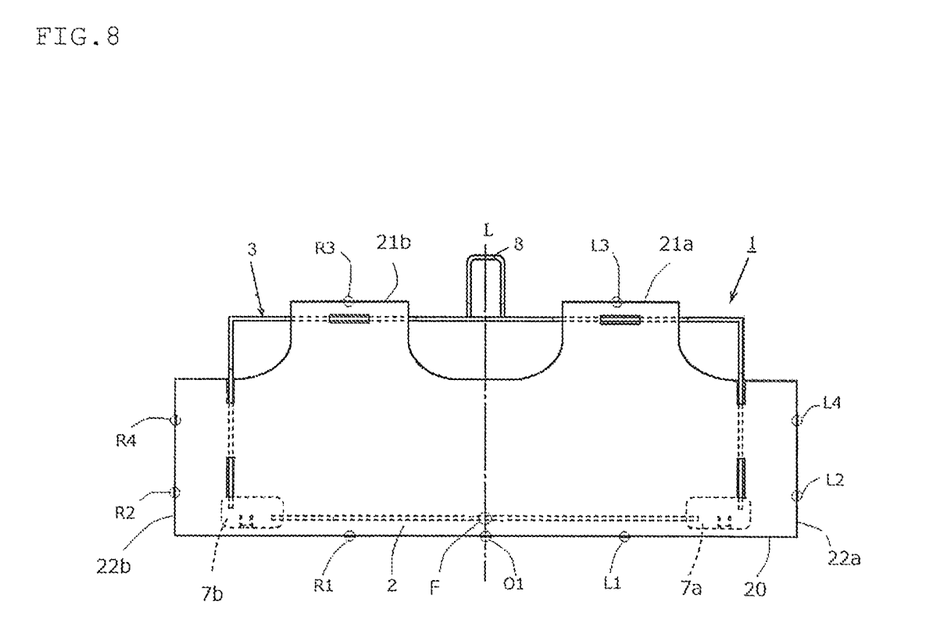
FIG. 8 is a plan view, corresponding to FIG. 2, showing the portions at which dimensional errors were measured for seat core materials obtained in Example and Comparative Example.

Each of the seat core materials of Example 1 and Comparative Example 1 was measured for dimensional errors relative to the design dimensions at nine measurement points O1, L1, L2, R1, R2, L3, R3, L4 and R4 shown in the plan view of FIG. 8 corresponding to FIG. 2. A shown in FIG. 8, the measurement point O1 is located on a line in which the vertical plane L intersects the front end 20. The measurement points L1 and R1 are located at positions separated rightward and leftward from the measurement point O1 by a distance of 300 mm. The measurement points L2 and R2 are located on side ends 22a and 22b, respectively, at positions separated from the front end 20 by a distance of 60 mm. The measurement points L4 and R4 are located on side ends 22a and 22b, respectively, at positions separated from the front end 20 by a distance of 200 mm. The measurement points L3 and R3 are located on the rear ends 21a and 21b at positions separated rightward and leftward from the center line L by a distance of 300 mm.

The above nine measurement points are all located at a position separated by a distance of 20 mm from the bottom surface 39 (see FIG. 3).

In each of the above measurement points, a deviation (unit: mm) from the target dimension and a direction of the deviation were measured to determine a dimensional error. The measurement results are shown in Table 1, in which an outward direction of deviation from the target product is indicated as a plus value while an inward direction of deviation is indicated as a minus value.

TABLE 1

| | Dimensional error [mm] | | |
| --- | --- | --- | --- |
| | Measurement Point | Product Sample | Comparative Sample |
| Front portion | O1 | 0.0 | 8.0 |
| | L1 | 0.0 | 2.5 |
| | L2 | −2.5 | 4.5 |
| | R1 | −1.0 | 4.5 |
| | R2 | −2.0 | 6.0 |
| Center portion | L4 | −1.5 | 4.0 |
| | R4 | 1.0 | 4.0 |
| Rear portion | L3 | −1.0 | −2.0 |
| | R3 | 1.0 | −1.0 |

From the results shown in Table 1, it was confirmed that the absolute values of the errors of the inventive sample corresponding to the above-described first embodiment were 2.5 mm or less in all measurement points and, therefore, the dimensional error was small. Incidentally, in the center portion in the front to rear direction of the substrate 2, the void cavity formed along and adjacent to the frame member 3 in an outer portion of the substrate 2 was displaced by shrinkage relative to the frame member and, as a result, the void cavity with a width of about 10 mm was found to be formed at a position inward (i.e., in the shrinkage direction of the substrate) from the frame member 3.

In the case of the comparative sample, on the other hand, errors are greater than those of the sample 1. Further, the dimension of the comparative sample deviates inward from the target dimension in the rear portion thereof and greatly deviates outward from the mold dimension in the center and front portions. It is thus seen that the comparative sample shows a great degree of deviation from the target dimension and, therefore, the shape of the substrate 2 thereof is significantly warped. Namely, when no void cavity that permits relative movement of the frame member 3 is formed in the substrate 2, it is difficult to achieve desired shape and dimensions.

A seat core material 11 of the second embodiment shown in FIG. 5 was molded using the same steps as those for the above inventive sample. As the frame member 13 and the substrate 12, those wire materials and resins used for the frame member 3 and the substrate 2 of the first embodiment were used. The molded seat core material 11 had smaller dimensional errors than a seat core material that was produced without forming the void cavity. No distortion such as warpage was found in the obtained seat core material 11.

EXPLANATION OF SYMBOLS

1: seat core material
2: foamed molded substrate
3: frame member
4a, 5a, 6a, 4b, 5b, 6b, 9a, 9b, 35a, 36a, 37a, 35b, 36b, 37b: groove
7a, 7b: frame connection plate portion
8: coupling protrusion
10a, 10b: hook
20: front end of the substrate
21: rear end of the substrate
22a, 22b: side ends of the substrate
24: front frame section
25: rear frame section
26a, 26b: side frame sections
27a, 27b: rear corner recess of the substrate
28: rear center recess of the substrate
29a, 29b: interconnected portion of frames
30a, 30b: supporting portion of the substrate
31: base wall (bottom portion)
32: side wall
33: side wall
34: opening
38: top surface of the substrate
39: bottom surface of the substrate
40: molding device
41: groove forming plate-shaped protrusion
42: mold cavity
S: void cavity or space
S': void cavity or space
11: seat core material
12: foamed molded substrate
12b: hole
13: frame member
13a: front frame section
13b: side frame section
13c: rear frame section

The invention claimed is:

1. A method for producing a seat core material that has a foamed molded substrate and a frame member embedded in a periphery thereof, said method comprising the steps of:
    (a) heating thermoplastic resin expanded beads in a mold cavity, in which the frame member has been disposed, to fusion-bond the expanded beads to each other and to obtain the foamed molded substrate with the frame member being embedded in the periphery thereof; and
    (b) simultaneously with step (a) or after step (a), forming a void cavity in the foamed molded substrate at a position along and adjacent to the frame member,
    wherein said void cavity has a size and shape that allows a relative displacement between the frame member and the foamed molded substrate when the foamed molded substrate shrinks after step (b).

2. The method according to claim 1,
    wherein said frame member is a looped frame having a front frame section, a rear frame section and two side frame sections that interconnect the front and rear frame sections,
    wherein step (a) is carried out such that the foamed molded substrate is formed with a front end, a rear end and two side ends, with said front frame section, two side frame sections and rear frame section being embedded in the foamed molded substrate at positions spaced inward from the front end, two side ends and rear end, respectively, and
    wherein step (b) is carried out such that the void cavity is formed in the foamed molded substrate at a position adjacent to at least one of the rear frame section and side frame sections.

3. The method according to claim 2,
    wherein step (a) is carried out such that the foamed molded substrate is additionally formed with two rear corner recesses,
    wherein interconnected portions between the two side frame sections and the rear frame section are completely exposed from the foamed molded substrate at the respective two rear corner recesses.

4. The method according to claim 3,
    wherein step (a) is carried out such that the rear end of the foamed molded substrate is additionally formed with a rear center recess between the two rear corner recesses so that the rear end is divided into two parts by said rear center recess between the rear corner recesses, and
    wherein the rear frame section is embedded in the foamed molded substrate at positions spaced inward from each of the two parts and completely exposed from the foamed molded substrate at the rear center recess.

5. The method according to claim 2,
    wherein step (b) is carried out simultaneously with step (a),
    wherein step (a) is carried out such that the foamed molded substrate is formed with at least three grooves which are arranged along at least one of the two side frame sections and rear frame section and which are opened alternately in opposite thickness directions, said at least three grooves having base walls that hold and supportingly engage the corresponding frame section alternately from upward and downward and forming said void cavity.

6. The method according to claim 2,
    wherein step (b) is carried out simultaneously with step (a),
    wherein step (a) is carried out such that the foamed molded substrate is formed with at least three grooves that are arranged along at least one of the two side frame sections and rear frame section and that are opened alternately in opposite thickness directions,
    wherein each of said grooves has a base wall and two opposed sidewalls and accommodates the corresponding frame section with said base wall engaging the corresponding frame section,
    wherein said sidewalls are spaced apart from each other a distance greater than the diameter of the corresponding frame section so that a space is formed adjacent to the corresponding side frame section in each of said at least three grooves, and
    wherein said at least three grooves are contiguously arranged so that said spaces of said at least three grooves are contiguous to each other and form said void cavity.

7. The method according to claim 3,
    wherein step (b) is carried out simultaneously with step (a),
    wherein step (a) is carried out such that the foamed molded substrate is formed with at least three grooves which are arranged along at least one of the two side frame sections and rear frame section and which are opened alternately in opposite thickness directions, said at least three grooves having base walls that hold and supportingly engage the corresponding frame section alternately from upward and downward and forming said void cavity.

8. The method according to claim 3,
wherein step (b) is carried out simultaneously with step (a),
wherein step (a) is carried out such that the foamed molded substrate is formed with at least three grooves that are arranged along at least one of the two side frame sections and rear frame section and that are opened alternately in opposite thickness directions,
wherein each of said grooves has a base wall and two opposed sidewalls and accommodates the corresponding frame section with said base wall engaging the corresponding frame section,
wherein said sidewalls are spaced apart from each other a distance greater than the diameter of the corresponding frame section so that a space is formed adjacent to the corresponding side frame section in each of said at least three grooves, and
wherein said at least three grooves are contiguously arranged so that said spaces of said at least three grooves are contiguous to each other and form said void cavity.

9. The method according to claim 4,
wherein step (b) is carried out simultaneously with step (a),
wherein step (a) is carried out such that the foamed molded substrate is formed with at least three grooves which are arranged along at least one of the two side frame sections and rear frame section and which are opened alternately in opposite thickness directions, said at least three grooves having base walls that hold and supportingly engage the corresponding frame section alternately from upward and downward and forming said void cavity.

10. The method according to claim 4,
wherein step (b) is carried out simultaneously with step (a),
wherein step (a) is carried out such that the foamed molded substrate is formed with at least three grooves that are arranged along at least one of the two side frame sections and rear frame section and that are opened alternately in opposite thickness directions,
wherein each of said grooves has a base wall and two opposed sidewalls and accommodates the corresponding frame section with said base wall engaging the corresponding frame section,
wherein said sidewalls are spaced apart from each other a distance greater than the diameter of the corresponding frame section so that a space is formed adjacent to the corresponding side frame section in each of said at least three grooves, and
wherein said at least three grooves are contiguously arranged so that said spaces of said at least three grooves are contiguous to each other and form said void cavity.

11. The method according to claim 1, wherein the thermoplastic resin expanded beads are expanded beads of a polyolefin-based resin, a polystyrene-based resin, a polyester resin, a polycarbonate-based resin or a mixed resin containing a polyolefin-based resin and a polystyrene resin.

* * * * *